United States Patent
Polk et al.

(10) Patent No.: US 6,889,492 B1
(45) Date of Patent: May 10, 2005

(54) REVERSING TRANSFER DRIVE FOR SICKLE CUTTING KNIVES ON A HEADER OF AN AGRICULTURAL COMBINE

(75) Inventors: Gary C. Polk, Lake Zurich, IL (US); Bin Lou, Woodridge, IL (US)

(73) Assignee: CNH America LLC, Racine, WI (US)

( * ) Notice: Subject to any disclaimer, the term of this patent is extended or adjusted under 35 U.S.C. 154(b) by 3 days.

(21) Appl. No.: 10/722,743

(22) Filed: Nov. 25, 2003

(51) Int. Cl.[7] .......................... A01D 34/02; A01D 34/30
(52) U.S. Cl. ........................................................ 56/257
(58) Field of Search .................. 56/257, 242, 236, 56/232, 259, 264, 297, 158, 123, DIG. 17

(56) References Cited

U.S. PATENT DOCUMENTS

| | | | |
|---|---|---|---|
| 445,616 A | 2/1891 | Runyon | |
| 898,155 A | 9/1908 | Thorp | |
| 1,511,501 A | 10/1924 | Campbell | |
| 1,635,050 A | 7/1927 | McKellar | |
| 1,913,721 A | 6/1933 | Pavelko | |
| 2,931,159 A | 4/1960 | Hill | 56/299 |
| 4,103,556 A * | 8/1978 | Niday | 74/25 |
| 4,198,803 A * | 4/1980 | Quick et al. | 56/296 |
| 4,446,683 A | 5/1984 | Rempel et al. | 56/296 |
| 4,866,921 A * | 9/1989 | Nagashima et al. | 56/257 |
| 4,910,946 A | 3/1990 | Underwood | 56/14.4 |
| 5,024,051 A * | 6/1991 | Glass et al. | 56/297 |
| 5,189,867 A | 3/1993 | Schmidt | 56/8 |
| 5,463,857 A * | 11/1995 | Blosser | 56/238 |
| 5,497,605 A | 3/1996 | Underwood et al. | 56/14.6 |

* cited by examiner

Primary Examiner—Árpád Fábián Kovács
(74) Attorney, Agent, or Firm—Brant T. Maurer; Rebecca Henkel

(57) ABSTRACT

A drive for transferring sideward motion from a first or driving elongate sickle knife to a second or driven elongate sickle knife longitudinally aligned with the first sickle knife. A double rack and pinion arrangement is used including at least one pinion mounted at a fixed location, a first sidewardly extending rack is connected to the first sickle knife for sideward movement therewith and a second sidewardly extending rack is connected to the second sickle knife for sideward movement therewith, the racks both being enmeshed with the pinion such that sideward movement of the driving knife causes corresponding opposite sideward movement of the longitudinally aligned driven knife.

18 Claims, 3 Drawing Sheets

US 6,889,492 B1

REVERSING TRANSFER DRIVE FOR SICKLE CUTTING KNIVES ON A HEADER OF AN AGRICULTURAL COMBINE

TECHNICAL FIELD

This invention relates generally to a reversing transfer drive for sickle cutting knives on a header of an agricultural combine, and more particularly, to a drive for transferring reciprocal longitudinal movement of one sickle cutting knife to a second knife substantially longitudinally aligned therewith, for overcoming negative effects, including undesirable vibration and fatigue failure of structural components.

BACKGROUND ART

Sickle cutting knives have been used to cut plants, including, but not limited to, hay, grasses, small grains and the like, for many years. The knives typically include an elongate metal sickle bar, with a plurality of knife sections attached along the lengths thereof. The sickle bar normally slides along a stationary bar that has guards with knives bolted to a structural beam. The sickle bar and stationary bar are oriented so as to extend sidewardly along a forward edge portion of a header of an agricultural combine. The sickle bar with the knife sections moves back and forth between the guards so that the leading edges of the knife sections cross over the guards or through slots in the guards. This produces a shearing action which severs plant stems and stalks or other material captured between the knives and the guards. The sickle bar is normally driven reciprocally longitudinally by an oscillating device, which can include, but is not limited to, an eccentric shaft on a rotating hub, a wobble drive, or a similar well known commercially available device. The sickle bar, which may weight as much as 60 pounds or more, typically must accelerate and decelerate two times per cycle as a result of the reciprocal movement. A typical speed for the sickle bar is up to about 16 hertz or cycles per second. The back and forth motion at a high cycle per second generates high acceleration values and high deceleration values that in turn generate high forces on the structural components. These high back and forth forces can have at least two negative effects, vibration at the sickle drive system that may be transmitted to other components of the machine causing discomfort for the operator, and fatigue failure of the structural components themselves.

One approach to overcome the above-listed negative effects has been to use two sickle bars each equal to one-half the sideward extent of the header, which are driven by two oscillating devices that are timed such that the sickle bars are traveling in opposite directions. However, this substantially increases costs, and it is difficult to sustain the timing of the two sickle bars. Other attempts include adding a weight equal to the sickle bar and traveling in an opposite direction at the drive end, but this also adds undesirable costs and weight.

Thus, what is sought is a drive for sickle cutting knives on a header of an agricultural combine which overcomes the problems, negative effects, and disadvantages and costs referenced above.

SUMMARY OF THE INVENTION

What is disclosed is a drive for transferring sideward motion from a first or driving elongate sickle cutting knife on a header of an agricultural combine to a second or driven elongate sickle knife on the header, which overcomes many of the problems, negative effects, shortcomings and disadvantages set forth above. The driving and driven sickle knives are mounted in substantially longitudinally aligned relation along a sidewardly or transversely extending forward portion of the header for sideward or transverse motion relative to a plurality of guards mounted thereon for severing plants to be inducted by the header. The present drive includes a double rack and pinion arrangement including a pinion mounted at a fixed location on the forward portion of the header. A first sidewardly or transversely extending rack is connected to the first sickle knife for sideward or transverse movement therewith and is enmeshed with the pinion. A second sidewardly extending rack is connected to the second sickle knife for sideward movement therewith and is enmeshed with the pinion opposite the first rack. In operation, when the first sickle knife is moved reciprocally sidewardly or transversely relative to the header, the first rack will move correspondingly reciprocally sidewardly or transversely to rotate the pinion so as to reciprocally sidewardly move the second rack and the second sickle knife oppositely to the sideward motion of the first rack and the first sickle knife. As a result, forces generated by the movement of the sickle knives are substantially opposing, thereby reducing associated negative effects including vibration and fatigue of the structural components of the sickle knives and the header.

According to a preferred aspect of the invention, the sickle knives include adjacent longitudinally endmost knife sections disposed one above the other for reciprocal movement, such that cutting action is obtained along substantially the entire sidewardly extending forward portion of the header. Also preferably the drive is contained in a housing or gear box disposed above or below and marginally rearwardly of the sickle knives, the racks being connected to the sickle knives using suitable elements that extend outwardly from the housing or gear box. For instance, the drive can be disposed generally above adjacent longitudinal ends of the knives and the racks are connected to the knives by elements which extend through holes through a bottom surface or portion of the housing or gear box. Alternatively, the elements can include longitudinally aligned bars or rods extending sidewardly from the gear box.

DETAILED DESCRIPTION OF THE INVENTION

Figure 1:
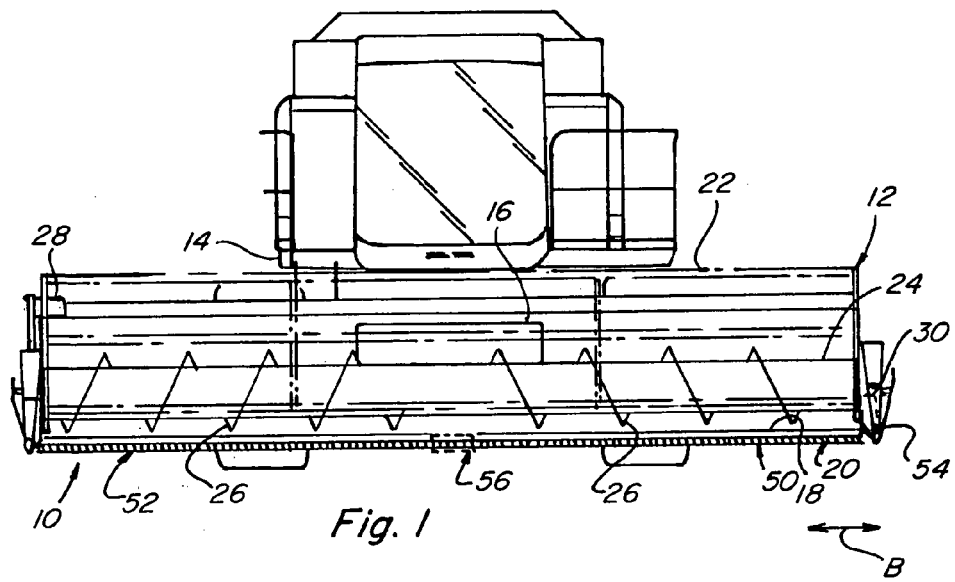
FIG. 1 is a forward end view of a representative agricultural combine including a header having a transfer drive for sickle knives thereof according to the present invention.

Turning now to the drawings wherein several preferred embodiments of the invention are shown, in FIG. 1, a conventional, well known agricultural combine 10 is shown including a conventional header 12 supported on a forward end 14 for cutting or severing crops such as, but not limited to, small grains such as wheat, and inducting the severed crops into a feeder 16 for conveyance into combine 10 for threshing and cleaning, in the well known manner as combine 10 moves forwardly over a field. Header 12 includes a bottom or pan 18 which is supported in close proximity to the ground surface of the field during the harvesting operation, and an elongate, sidewardly extending sickle 20 along a forward edge of pan 18 which severs the crop for induction into header 12. Header 12 additionally includes an elongate, sidewardly extending reel 22 disposed above pan 18 and rotatable in a direction for facilitating induction of the severed crops into header 12, and an elongate, rotatable auger 24 that extends in close proximity to a top surface of pan 18 and has spiral flights 26 therearound which convey the severed crops to feeder 16 for induction into combine 10. Header 12 additionally includes a fluid motor 28 drivingly connected to reel 22 for effecting rotation thereof, and a wobble box 30 which drives sickle 20, as will be discussed.

Figure 2:
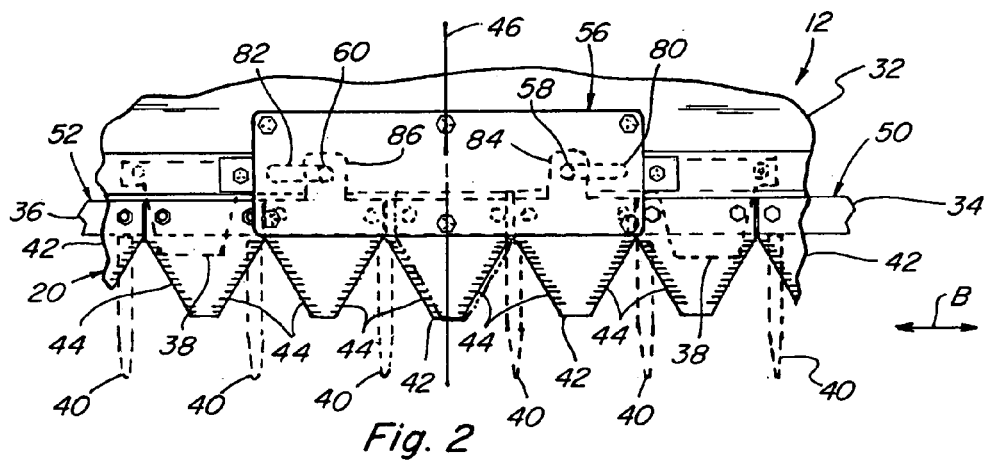
FIG. 2 is an enlarged fragmentary top view of the header of FIG. 1, showing the drive of FIG. 1.

Referring also to FIG. 2, sickle 20 extends in a sideward direction along the length of header 12 forwardly of a forward end portion 32 of header 12. Sickle 20 includes an elongate, sidewardly extending first sickle bar 34, and an elongate, sidewardly extending second sickle bar 36 supported in substantially longitudinally aligned relation on forward end portion 32 for sideward longitudinal movement relative to header 12. Sickle bars 34 and 36 are supported between a plurality of hold downs 38 suitably attached to forward end portion 32 and projecting forwardly thereof above sickle bars 34 and 36, and a stationary bar beneath sickle bars 34 and 36 which supports a plurality of forwardly extending, spaced guards 40. Sickle bars 34 and 36, in turn, each support a plurality of knife sections 42 which are bolted or otherwise attached to the sickle bar. Each guard 40 includes a sidewardly extending slot therethrough (not shown), through which all or a portion of an adjacent knife section 42 can pass when moved in a sideward direction relative thereto, as denoted by arrow B. That is, first and second sickle bars 34 and 36 support and hold knife sections 42 in end-to-end relation and are reciprocally movable sidewardly in the direction B for performing a cutting function against edges of adjacent guards 40. In this regard, each knife section 42 includes angularly oriented serrated edges 44 which cut or sever the crops in cooperation with edges on guards 40 in the well known conventional manner.

Figure 3:
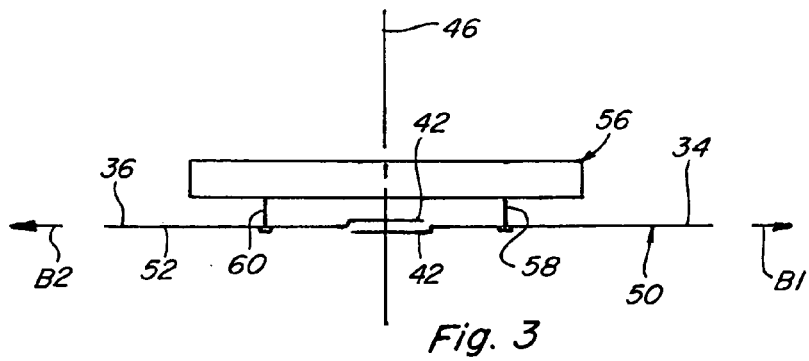
FIG. 3 is a simplified schematic front view of the drive of FIG. 1, illustrating opposite reciprocal movement of the sickle knives of the header.

In the present arrangement, header 12 has a side-to-side center line 46, first sickle bar 34 being located substantially on one side of center line 46, and second sickle bar 36 being located on an opposite side. It should be noted, however, that sickle bar 34 and 36 respectively support endmost knife sections 42 located one above the other, or in overlaying relation, generally centered about center line 46, as best illustrated in FIG. 3. This is desirable as it provides a center cutting action centered along center line 46 such that no significant cutting gap exists in that region. Here, it should be noted that, as an alternative, sickle bars 34 and 36 could be vertically offset and overlapping, to obtain a similar capability.

First sickle bar 34 and knife sections 42 supported thereon comprise a first sickle cutting knife 50 and second sickle bar 36 and knife sections 42 thereon comprise a second sickle cutting knife 52. Sickle cutting knife 50 is denoted as the driving knife, as an end 54 thereof is connected to an output of wobble box 30 for movement in direction B, as best shown in FIG. 1, and sickle cutting knife 52 is denoted as the driven knife, as will be explained. As noted above under the Background Art heading, it is desirable to reduce negative effects, including, but not limited to, vibration, fatigue failure, and the like, resulting from back and forth sideward motion of sickle 20. This is achieved according to the present invention by utilizing separate knives 50 and 52 in end-to-end axially aligned relation, and simultaneously reciprocally moving them oppositely in direction B such that forces exerted as a result of acceleration and deceleration of each of the knives are offset by the counteracting forces of the other knife. Simultaneous sideward movement in opposite directions of knives 50 and 52 is achieved by connecting knife 50 in driving relation to knife 52 by a reversing transfer drive 56 constructed and operable according to the teachings of the present invention.

Referring more particularly to FIG. 3, reversing transfer drive 56 is disposed just above adjacent ends of knives 50 and 52 and includes an input element 58 connected to knife 50 and an output element 60 connected to knife 52. Drive 56 is passively operable when knife 50 is moved, to move input element 58 in direction B1 to simultaneously move output element 60 and thus knife 52 in the opposite direction B2. And, when knife 50 reverses direction to move in direction B2 to move input 58 in that direction, drive 56 will simultaneously move output element 60 and thus knife 52, in the opposite direction B1, this occurring reciprocally at the desired frequency of, for instance, 16 cycles per second.

Figure 4:
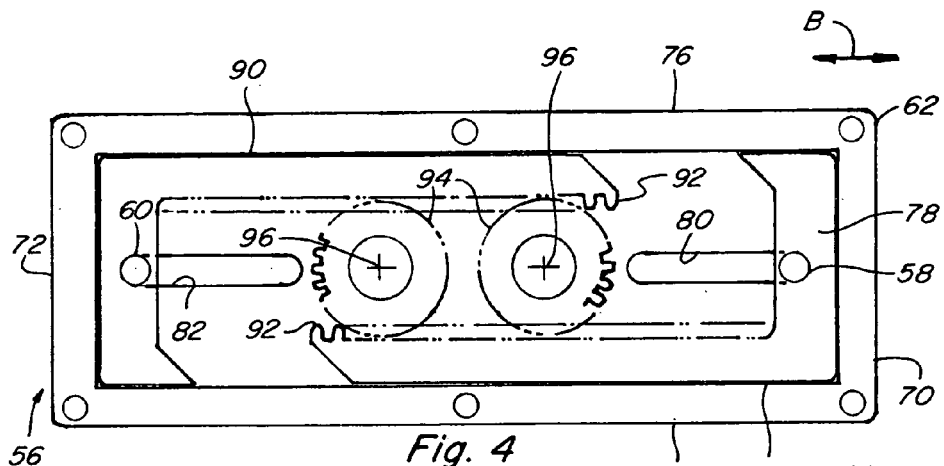
FIG. 4 is a top view of the drive of FIG. 1 with a top cover removed to expose internal components thereof.
Figure 5:
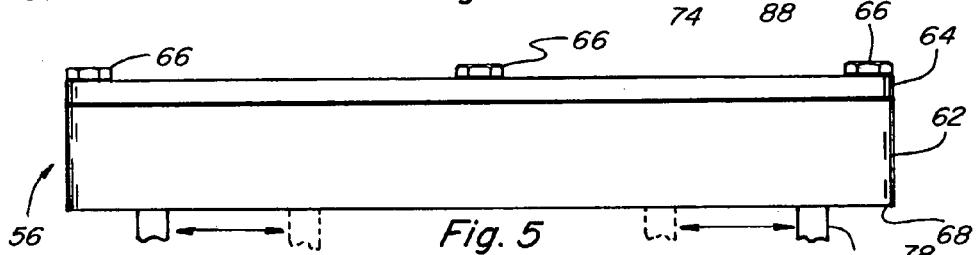
FIG. 5 is a front view of the drive of FIG. 1, illustrating opposite reciprocal sideward movement of elements thereof for connection to the sickle knives of the header.

Referring also to FIGS. 4 and 5, drive 56 preferably includes a substantially rectangular, low vertical profile gear box or housing 62 of sturdy, rigid construction, such as of a metal such as steel or aluminum, including a removable top cover 64 held in position by an array of bolts 66 or other suitable fasteners or the like. Housing 62 can be mounted to forward end portion 32 of header 12 in any suitable manner, such as using additional or the same bolts or the like, as desired so as to be positioned generally above sickle bars 34 and 36, and centered about over center line 46, as best shown in FIG. 2. Housing 62 has a bottom 68 extending between upwardly extending side walls 70 and 72 and forward and rear walls 76, defining an upwardly open interior 78 encloseable by top cover 64. Bottom 68 includes a pair of spaced, elongate sidewardly extending slots 80 and 82 therethrough connecting with interior 78. Input element 58 extends through slot 80 and output element 60 extends through slot 82, elements 58 and 60 being longitudinally movable in the respective slots, as evident from FIGS. 2, 4 and 5. A lower end of input element 58 connects to a rearwardly extending tab 84 connected to first sickle bar 34 for sideward movement therewith, and a lower end of output element 60 connects to a tab 86 extending rearwardly from second sickle bar 36 for sideward movement therewith. An upper end of input element 58 is connected to a first rack 88 disposed in interior 78 of housing 62, and an upper end of output element 60 is connected to a second rack 90. Racks 88 and 90 are each elongate members oriented and supported for longitudinal sideward movement in interior 78 at least a distance corresponding to the contemplated extent of sideward movement of the respective knives 50 and 52. Racks 88 and 90 are mirror images of one another and are oriented such that respective toothed faces 92 thereof are positioned in spaced, opposing relation. Preferably, two pinions 94 are located in a space between opposing toothed or geared faces 92 and have teeth enmeshed therewith. Each pinion 94 is mounted for rotation in housing 62 at the position shown in FIG. 4.

Referring also again to FIG. 3, as a result, when knife 50 is driven by wobble box 30 in the direction B1 (to the right in FIG. 4), rack 88 will be moved in the same direction, such that each pinion 94 will be rotated counterclockwise. In turn, this will cause rack 90 to be driven in direction B2 (to the left in FIG. 4) so as to correspondingly drive knife 52 in that direction. At the end of the travel of knife 50, knife 50 will decelerate and reverse direction and be accelerated by wobble box 30 in the direction B2 (to the left in FIG. 4), and rack 88 will be moved thereby in the same direction, such that each pinion 94 will be rotated clockwise. This will cause rack 90 to be driven in direction B1 (to the right in FIG. 4) so as to correspondingly drive knife 52 in that direction. As a result of the aligned, opposite reciprocating movement of knives 50 and 52, opposing forces generated from acceleration and deceleration of knives 50 and 52 are substantially aligned in the sideward direction and at least substantially offset and opposite one another, so that vibration output from the motion is minimized, and some resultant fatigue damage is reduced. Vibration reduction is further facilitated by the symmetrical relationship of input element 58 and output element 60 along a sidewardly extending axis through rotational centers 96 of pinions 94. Slots 80 and 82 can be suitably sealed or covered as required, for instance, using cover plates that move with input and output 58 and 60, such that interior 78 can be partially filled with a suitable lubricant such as a grease or oil for lubricating the movable members.

As another advantage, the low profile height of drive 56 and the center cutting capability of overlapping knife sections 42 (FIG. 3) provides the capability for an uninterrupted continuous crop cutting and infeeding capability across the sideward length of header 12.

Figure 7:
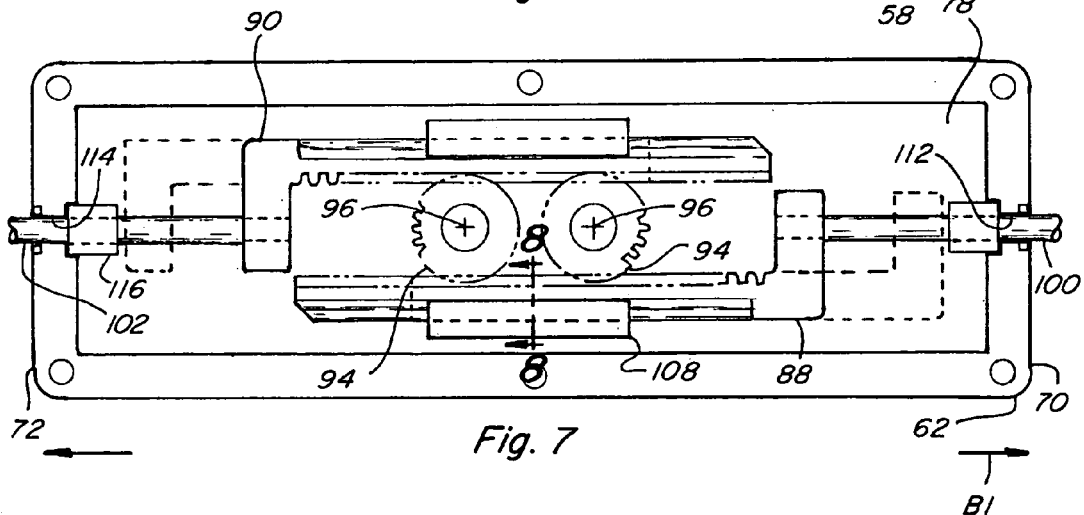
FIG. 7 is a top view of the drive of FIG. 6 with a top cover removed to show internal components thereof.
Figure 6:
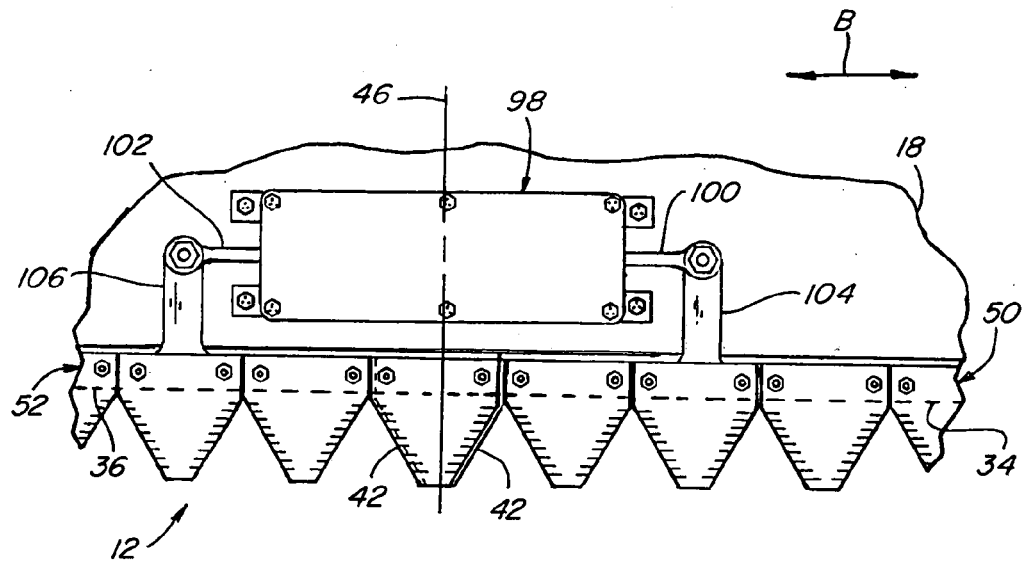
FIG. 6 is a fragmentary top view of the header of the combine of FIG. 1, showing an alternative transfer drive for the sickle knives according to the invention.

In FIG. 6, header 12 is shown including another reversing transfer drive 98 constructed and operable according to the teachings of the present invention, like parts of drive 98 and drive 48 being identified by like numbers. Referring also to FIG. 7, drive 98 is preferably contained in an interior 78 of an elongate, sidewardly extending, low profile gear box or housing 62 enclosable with a cover 64 as explained above. Drive 98 differs from drive 56 externally by a location on or in pan 18 more rearwardly of knives 50 and 52, and by the provision of an input 100 and an output extending in opposite, sidewardly extending directions, denoted by arrow B, from housing 62. Input 100 and output 102 are connected to sickle bars 34 and 36 of knives 50 and 52 by arms 104 and 106, respectively or other suitable elements or linkages. Knives 50 and 52 are again shown including endmost knife sections 42 adjacent centerline 46 which overlap, as explained above. Input 100, output 102, and arms 104 and 106 can be suitably covered or shielded as required to prevent jamming or otherwise interfering with movement thereof or damage thereto by crops, weeds and the like severed by knives 50 and 52.

Figure 8:
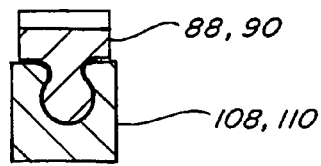
FIG. 8 is a sectional view taken along line 8—8 of FIG. 7.

Internally, first and second racks 88 and 90 are supported for longitudinal sideward movement in spaced, opposing relation in interior 78 and enmeshed with pinions 94, by linear bearings 108 and 110, respectively. A representative cross-section of engagement of racks 88 and 90, and bearings 108 and 110 is shown in FIG. 8. Input 100 and output 102 extend through holes 112 and 114 through side walls 70 and 72 of housing 62, respectively, which can include suitable sealing members such as seal rings 116 or the like.

As with drive 56, when knife 50 is driven by wobble box 30 in the direction B1 (to the right in FIG. 7), rack 88 will be moved in the same direction, such that each pinion 94 will be rotated counterclockwise. In turn, this will cause rack 90 to be driven in direction B2 (to the left in FIG. 4) so as to correspondingly drive knife 52 in that direction. At the end of the travel of knife 50, knife 50 will decelerate and reverse direction and be accelerated by wobble box 30 in the direction B2 (to the left in FIG. 4), and rack 88 will be moved thereby in the same direction, such that pinions 94 will be rotated clockwise. This will cause rack 90 to be driven in direction B1 (to the right in FIG. 7) so as to correspondingly drive knife 52 in that direction. As a result of the aligned, opposite reciprocating movement of knives 50 and 52, opposing forces generated from acceleration and deceleration of knives 50 and 52 are substantially aligned in the sideward direction and at least substantially offset and opposing, so that vibration output from the motion is minimized or reduced, as is the potential for resultant fatigue damage. Vibration reduction is further facilitated by the symmetrical relationship of input 100 and output 102 along a sidewardly extending axis through rotational centers 96 of pinions 94.

Figure 9:
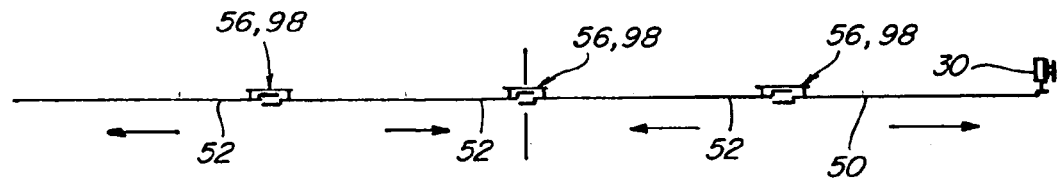
FIG. 9 is a simplified schematic front view of an alternative header for use with the combine of FIG. 1, showing a plurality of transfer drives according to the invention for driving sickle knives reciprocally sidewardly in opposite directions.

FIG. 9 illustrates another alternative application for reversing drives 56, 98 of the present invention, wherein a single driving sickle cutting knife 50 is suitably reciprocally sidewardly movable by a wobble box 30 or other powers source. Knife 50 is connected by a first reversing transfer drive 56 or 98 to a driven sickle cutting knife 52, which, in turn, is connected in driving relation to an adjacent knife 52 by a second drive 56 or 98. In turn, the adjacent knife 52 is connected by another drive 56 or 98 to still another knife 52. In operation, sideward movement of knife 50 by wobble box 30 to the right as shown by the rightmost arrow will cause sideward movement of the first knife 52 to the left, which will simultaneously drive the third knife to the right, which, at the same time, will drive the fourth knife to the left. When knife 50 changes direction, the knives 52 will also change direction. Because an even number of knifes 50 and 52 are provided, forces resulting from sideward movement, acceleration, and deceleration thereof will be substantially opposing as above, thus providing reduced vibration during operation compared to the use of a single sickle knife or multiple sickle knives all moving in the same sideward or transverse direction.

Here, it should be noted that although drives 56 and 98 are each shown including pair of pinions 94, each could likewise include as few as one pinion 94, or one or more additional pinions, as desired. For instance, for longer sideward distances of travel of the knives, more pinions and even longer racks may be used. Conversely, for shorter distances of travel, as few as one pinion and correspondingly shorter length racks can be used. It should also be noted that it is contemplated to locate the reversing transfer drives of the invention at other locations on a header such as header 12, such as more rearwardly on or in the header, with connection to the respective knives by longer forwardly to rearwardly extending elements such as longer arms 104 and 106, linkages or the like. The drives can also be extend upwardly from pan 18 by a greater extent than depicted here, although this is not preferred, as the possibility of undesirably interfering with crop induction may increase. Still further, although in each of the instances set forth above adjacent longitudinally endmost ones of the knife sections of the sickle knives are depicted as overlapping to achieve a center cutting capability, other arrangements such as mounting all or the adjacent end of one of the sickle knives slightly lower than the other to achieve an overlap could be used.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A drive for transferring sideward motion from a first elongate sickle cutting knife on a header of an agricultural combine to a second elongate sickle knife on the header, the sickle knives being mounted in substantially longitudinally aligned relation along a sidewardly extending forward portion of the header for sideward motion relative thereto, the drive comprising:
    a double rack and pinion arrangement including at least one pinion mounted at a fixed location on the forward portion of the header, a first sidewardly extending rack connected to the first sickle knife for sideward movement therewith enmeshed with the pinion, and a second sidewardly extending rack connected to the second sickle knife for sideward movement therewith enmeshed with the pinion opposite the first rack, such that when the first sickle knife is moved reciprocally sidewardly relative to the header, the first rack will move correspondingly reciprocally sidewardly to reciprocally rotate the pinion so as to reciprocally sidewardly move the second rack and the second sickle knife oppositely to the reciprocal sideward movement of the first rack and the first sickle knife.

2. The drive of claim 1, wherein the first rack is connected to the first sickle knife by an elongate sidewardly extending first element and the second rack is connected to the second sickle knife by an elongate sidewardly extending second element, the first and second elements being substantially longitudinally aligned.

3. The drive of claim 2, wherein the drive is contained in a sidewardly extending housing and the racks are supported, respectively, for side to side movement within the housing by linear bearings.

4. The drive of claim 1, wherein the drive is contained in a housing disposed at least partially above the sickle knives and the racks are connected to the knives, respectively, by elements which extend through openings in a bottom of the housing.

5. The drive of claim 1, wherein the sickle knives include longitudinal ends disposed one above the other for relative reciprocal movement.

6. The drive of claim 1, comprising two of the pinions.

7. A reversing transfer drive for an elongate driven sickle knife extending in end-to-end relation to an elongate driving sickle knife for reciprocally driving the driven sickle knife transversely along a forward end of a header of an agricultural combine as the driving sickle knife is reciprocally driven by a power source connected thereto transversely along the forward end of the header, for severing crops to be inducted by the header as the combine is moved forwardly over a field, the reversing transfer drive comprising:
    a double rack and pinion arrangement including spaced transversely extending driving and driven racks enmeshed with at least one pinion gear supported for rotation in the space between the racks such that movement in a first transverse direction of the driving rack will rotate the pinion gear so as to move the driven rack in a second transverse direction opposite the first transverse direction, and elements connecting the driving and the driven racks to the driving and driven sickle knives, respectively.

8. The drive of claim 7, wherein the driving rack is connected to the driving sickle knife by an elongate sidewardly extending input and the driven rack is connected to the driven sickle knife by an elongate sidewardly extending output, the input and the output being substantially longitudinally aligned.

9. The drive of claim 8, wherein the drive is contained in a sidewardly extending housing and the racks are supported, respectively, for side to side movement within the housing by linear bearings.

10. The drive of claim 7, wherein the drive is contained in a housing disposed at least partially above the driving and driven sickle knives and the driving and driven racks are connected to the driving and driven knives, respectively, by said elements which extend through openings in a bottom of the housing.

11. The drive of claim 7, wherein the sickle knives include longitudinal ends disposed one above the other for relative reciprocal movement.

12. The drive of claim 7, comprising two of the pinions.

13. Sickle apparatus for a forward end of a header for an agricultural combine, comprising:
    an elongate first sickle knife extending sidewardly along a first portion of the forward end of the header for reciprocal sideward movement therealong;
    an elongate second sickle knife extending sidewardly along a second portion of the forward end of the header for reciprocal sideward movement therealong in substantially longitudinally aligned end-to-end relation to the first knife; and
    a reversing transfer drive including a double rack and pinion arrangement including spaced sidewardly extending first and second racks and at least one pinion supported for rotation between the racks and enmeshed therewith such that movement in a first sideward direction of the first rack will rotate the pinion so as to move the second rack in a second sideward direction opposite the first sideward direction, and elements connecting the first and second racks to the first and second sickle knives, respectively.

14. The apparatus of claim 13, wherein the first rack is connected to the first sickle knife by an elongate sidewardly extending input and the second rack is connected to the second sickle knife by an elongate sidewardly extending output, the input and the output being substantially longitudinally aligned.

15. The apparatus of claim 14, wherein the drive is contained in a sidewardly extending housing and the racks are supported, respectively, for side to side movement within the housing by linear bearings.

16. The drive of claim 13, wherein the drive is contained in a housing disposed at least partially above the sickle knives and the first and second racks are connected to the first and second knives, respectively, by said elements which extend through openings in a bottom of the housing.

17. The drive of claim 13, wherein the sickle knives include longitudinal ends disposed one above the other for relative reciprocal movement.

18. The drive of claim 13, comprising two of the pinions.

* * * * *